United States Patent [19]

Knox

[11] 4,074,267
[45] Feb. 14, 1978

[54] DEVICE FOR NUMERICALLY DISPLAYING VOR BEARING

[75] Inventor: Sidney G. Knox, Oxnard, Calif.

[73] Assignee: The United States of America as represented by the Secretary of the Navy, Washington, D.C.

[21] Appl. No.: 686,976

[22] Filed: May 17, 1976

[51] Int. Cl.$^2$ .............................................. G01S 1/50
[52] U.S. Cl. .............................. 343/106 R; 324/83 D; 328/134
[58] Field of Search ..................... 343/106 R; 328/134; 324/83 D

[56] References Cited

U.S. PATENT DOCUMENTS

| 3,386,096 | 5/1968 | Lundgreen et al. | 343/106 R |
| 3,919,706 | 11/1975 | Grimm et al. | 328/134 X |

Primary Examiner—Maynard R. Wilbur
Assistant Examiner—Richard E. Berger
Attorney, Agent, or Firm—Richard S. Sciascia; Joseph M. St.Amand; William W. Cochran, II

[57] ABSTRACT

A digital numeric VHF omnidirectional range (VOR) bearing indicator for providing a stable digital readout of VOR bearing in the presence of noise and fading signals. The device utilizes a count averaging scheme for calculating VOR bearing over a plurality of cycles. High quality filtering is also achieved by the use of phase lock loops which are used to generate low noise digital signals having a phase which matches reference and variation signals, representing VOR bearing. An exclusive "OR" gate is used to compare the reference and variation signals, after they are divided in frequency, to produce a composite signal which has a duration indicative of VOR bearing. The composite signal is then clocked, counted and averaged over a number of intervals and fed to a digital display device.

12 Claims, 39 Drawing Figures

REF (0°)

REF (0°)

VAR 2°

VAR 2°

VAR 180°

VAR 180°

VAR 358°

VAR 358°

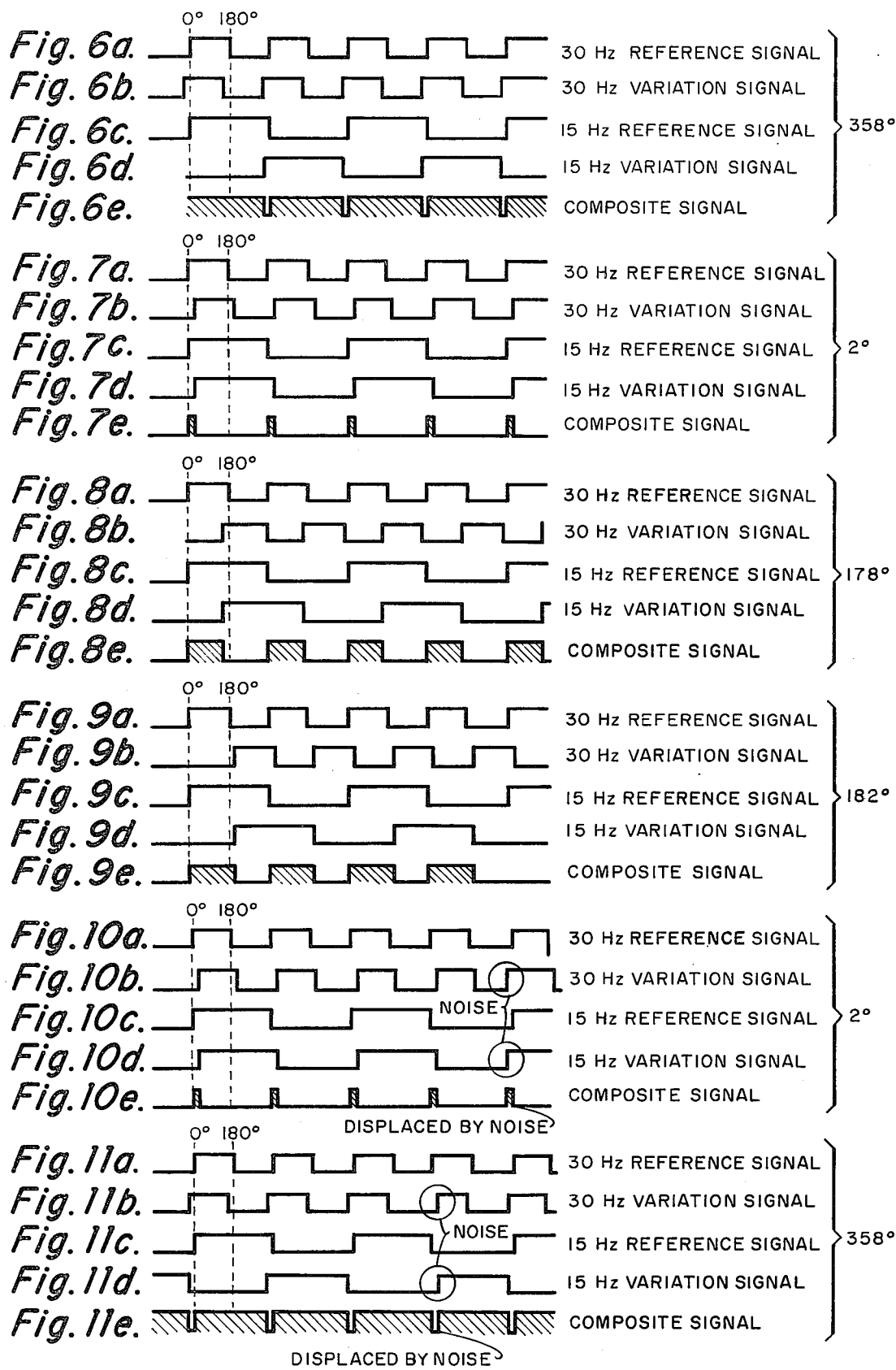

DEVICE FOR NUMERICALLY DISPLAYING VOR BEARING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention pertains generally to navigational devices and more particularly to VOR bearing indicators. Conventional VOR indicators use a round dial known as an omnibearing selector which is marked from zero to 360°, referenced against an index mark and normally rotated with a knob to the desired bearing. A meter on the device provides a left/right indication of the position of the aircraft to the radial bearing selected on the omnibearing selector. The pilot can therefore determine his location on a radial bearing from the VOR station by rotating the omnibearing selector until the meter is centered. Many times, however, it is desirable to have an automatic indication of bearing without the necessity of adjusting an omnibearing selector, especially in cases where time is of the essence, in a distress situation, for example. Additionally, where a pilot must triangulate his location, the omnibearing selector device is unable to provide a highly resolved bearing indication due to the nature of the mechanical devices used to indicate bearing. Additionally, these mechanical devices are naturally prone to failure after their fairly short lifespan is exceeded.

To overcome these disadvantages and limitations, various methods have been used to produce a device for electronically, digitally displaying VOR bearing. One method used in the prior art to produce an electronic signal indicative of VOR bearing has been to determine the difference in phase by counting the time difference between the positive going zero crossing of the reference signal and the positive going zero crossing of the variation signal for each cycle. In the presence of a noisy or fading signal, the zero crossings can vary to indicate bearings which are in error by 20° or more. In addition, a digital readout does not display a stable signal on which the pilot can rely.

To overcome these problems, a method was developed whereby a plurality of count intervals based on zero crossings were calculated and then averaged in the electronic device. This method provided a stable readout in the presence of a noisy and fading signal. However, this averaging scheme presented problems when the aircraft was located near the zero degree radial from the VOR station. In this case, and especially when the aircraft is flying along or approximate to the zero degree radial, noise signals cause the reference and variation phase differences to occasionally jump from one side of the zero degree radial to the other. For example, if the pilot was flying along the 2° radial in the presence of a weak, noisy and fading signal, atmospheric or multipath noise could cause the phase difference between the variation and reference signal to erroneously indicate to the equipment that the location of the aircraft was, for example, along the 358° radial for at least one cycle. In an averaging scheme where small angles, such as 1° or 2°, would be indicated by a very small count, large degree angles such as 358° would be indicated by a large count. The presence of one or more erroneous pulses produced by noise during the averging cycle of either signal would cause an obviously erroneous average count. More specifically, if a series of one degree clock pulses is used to produce the counting pulses and the phase difference between the reference and variation signals is counted for 32 cycles, a total count pulse of 64 counts would be produced for a radial bearing of 2°. This total of 64 would be averaged by dividing by 32 to indicate a bearing of 2°. In the case where noise shifts a single pulse of either the reference or variation signals to indicate a phase difference between these signals of, for instance, 359°, a count of 358 would be averaged for one interval with the remaining 62 counts and divided by 32 to obtain an average indicative of a radial bearing of approximately 13°. Even more error is obtained if more than one pulse is shifted by noise. The same is true for the case where aircraft is located at a very high degree radial, such as 358°, and noise shifts one or more pulses so that small counts are being averaged with larger counts to indicate an erroneous bearing.

SUMMARY OF THE INVENTION

These disadvantages and limitations of the prior art are overcome in the present invention by providing an improved VOR bearing indicator numeric readout stabilization device. The present invention utilizes a frequency dividing scheme whereby the reference and variation signals are halved in frequency and applied to an exclusive "OR" gate. The halved frequency signals are then compared in phase only up to 180° phase difference, representative of a 360° phase difference in the original reference and variation signals, so that noise introduced in the original reference and variation signals causes the halved frequency signals to fluctuate only about the 180° mark, thereby avoiding averaging of disproportionate numbers. The invention also utilizes phase lock loops for generating low noise signals having phases which match the original variation and reference signals.

It is therefore an object of the present invention to provide an improved VOR bearing indicator numeric readout stabilization device.

It is also an object of the present invention to provide a VOR bearing indicator numeric readout device which is capable of providing a stable readout in the presence of noisy and fading signals.

Another object of the present invention is to provide a VOR bearing indicator numeric readout device which is capable of providing a stable numeric readout when flying proximate to the zero degree radial in the presence of noisy signals.

Other objects and further scope of applicability of the present invention will become apparent from the detailed description given hereinafter. The detailed description indicating the preferred embodiments of the invention is given only by way of illustration since various changes and modifications within the spirit and scope of the invention will become apparent to those skilled in the art from this detailed description. The foregoing abstract of the disclosure is for the purpose of providing a non-legal brief statement to serve as a searching and scanning tool for scientists, engineers, and researchers and is not intended to limit the scope of the invention as disclosed herein, nor is it intended to be used in interpreting or in any way limiting the scope or fair meaning of the appended claims.

BRIEF DESCRIPTION OF THE DRAWINGS

FIG. 2b is a squarewave signal produced from the wave signal of FIG. 2a.

FIG. 3b is a squarewave signal produced from a wave pattern of FIG. 3a.

FIG. 4b is a squarewave pattern produced from the wave pattern of FIG. 4a.

FIG. 5b is a squarewave pattern produced from the wave pattern of FIG. 5a.

FIGS. 6a through 6e show the 30 Hz reference and variation signals, the 15 Hz reference and variation signals and a composite signal, for a phase difference of approximately 358°.

FIGS. 7a through 7e show the 30 Hz reference and variation signals, 15 Hz reference and variation signals and composite signals for a phase difference of approximately 2°.

FIGS. 8a through 8e show the 30 Hz reference and variation signals, 15 Hz reference and variation signals, and composite signal for a phase difference of approximately 178°.

FIGS. 9a through 9e show the 30 Hz reference and variation signals, 15 Hz reference and variation signals, and composite signal for a phase difference of approximately 182°.

FIGS. 10a through 10e illustrate 30 Hz reference and variation signals, 15 Hz reference and variation signals, and composite signal for a phase difference of 2° with the introduction of a noise pulse within a single cycle of the variation signal.

FIGS. 11a through 11e illustrate 30 Hz reference and variation signals, 15 Hz reference and variation signals, and a composite signal for a phase difference of approximately 358° with the introduction of a noise pulse in a single cycle of the variation signal.

DETAILED DESCRIPTION OF THE PREFERRED EMBODIMENT

Figure 1:
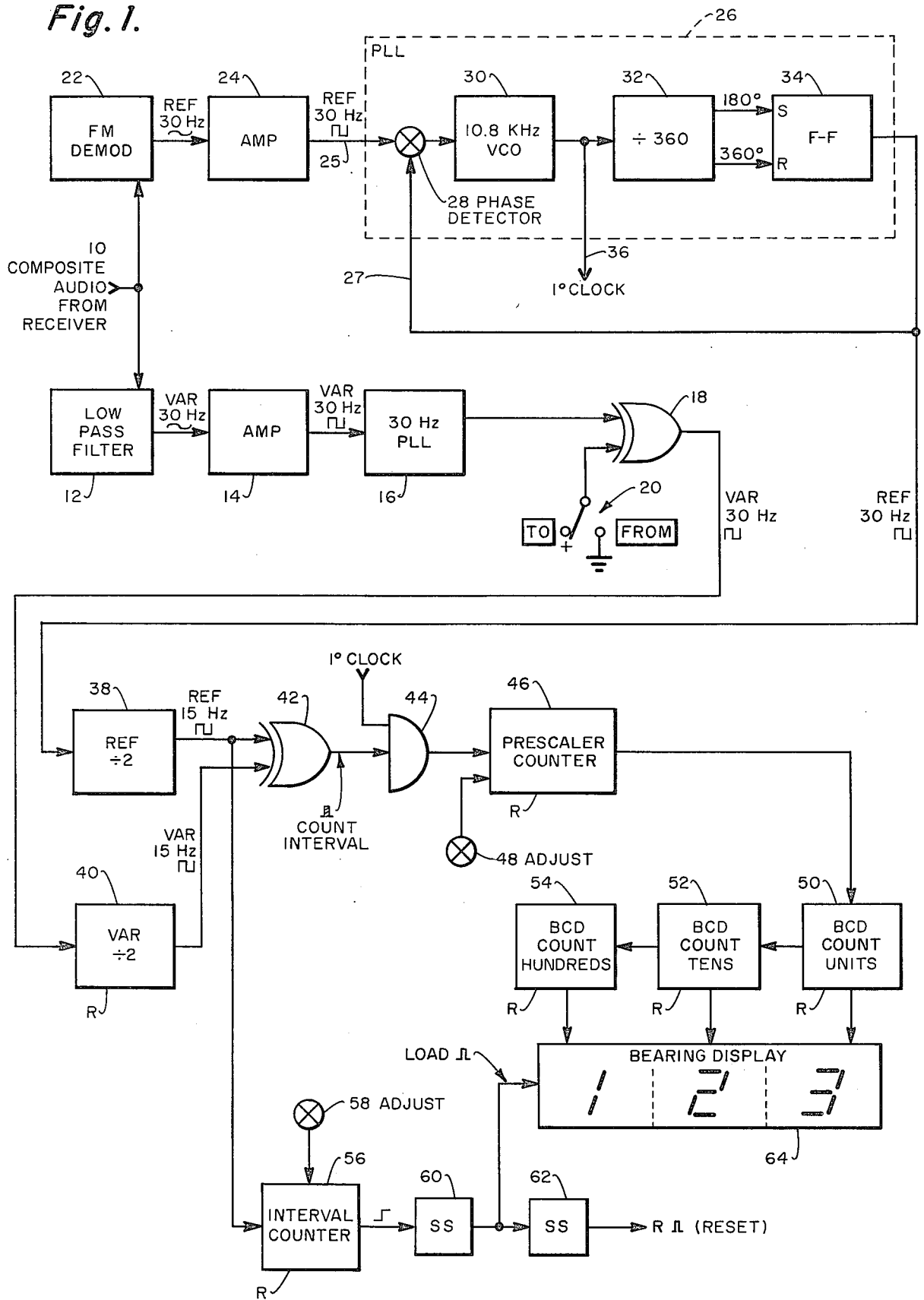
FIG. 1 is a block diagram of the preferred embodiment of the invention.

FIG. 1 is a block diagram of the preferred embodiment of the invention. The composite audio signal from the receiver 10 is applied to both the low pass filter 12 and the FM demodulator 22. The low pass filter 12 filters out the 30 Hz variation signal while the FM demodulator 22 demodulates the 30 Hz reference signal. The VOR station produces these signals by rotating an antenna at the station at a frequency of 30 Hz. The rotating lobe pattern of the antenna gain is designed to produce a variation signal which varies in magnitude to approximate a sinusoidal function. The phase of the variation signal therefore varies according to the radial location from the VOR bearing. The reference signal is also modulated on the composite signal 10 and has a constant phase for any radial location about the VOR station. A comparison of the reference and variation signals therefore indicates a phase difference which is proportional to radial location.

Figure 2A:
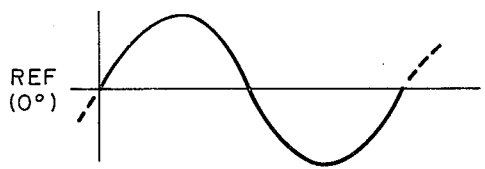
FIG. 2a is a zero degree reference signal.
Figure 2B:
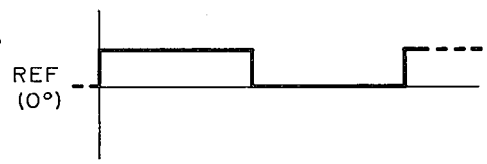
Figure 3A:
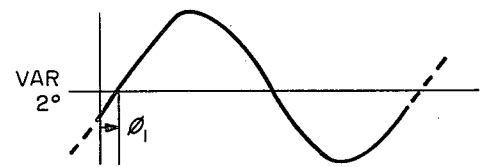
FIG. 3a is a diagram of a two degree variation signal.
Figure 3B:
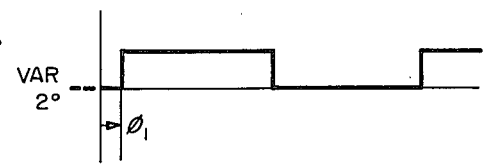
Figure 4A:
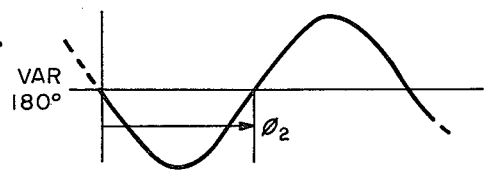
FIG. 4a is a 180° variation signal pattern waveform.
Figure 4B:
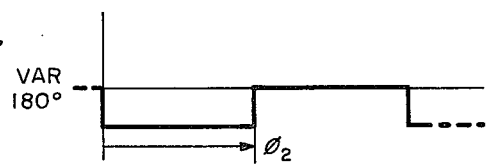
Figure 5A:
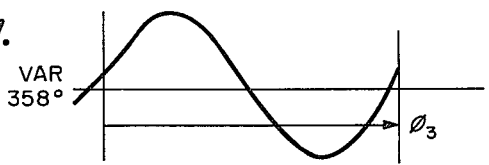
FIG. 5a is a 358° variation signal pattern waveform.
Figure 5B:
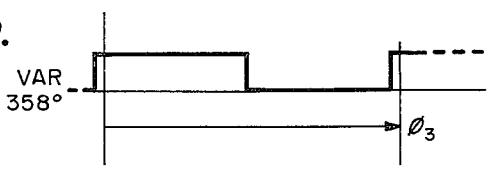

The 30 Hz reference signal and variation signal are applied to limiting amplifiers 24 and 14, respectively, which produce squarewave outputs. The demodulated 30 Hz reference signal is shown in FIG. 2a after demodulation by FM demodulator 22. The squarewave signal produced by limiting amplifier 24 is shown in FIG. 2b. FIGS. 2a, 4a, and 5a show a series of modulated 30 Hz variation signals as they would appear at the output of low pass filter 12 having various phase differences when compared to the reference signal shown in FIG. 2a. When these signals are applied to limiting amplifier 14, they produce squarewave outputs, as shown in FIGS. 3b, 4b, and 5b. The 30 Hz reference squarewave output is then applied to a phase lock loop 26 containing a phase detector 28, a 10.8 KHz voltage controlled oscillator 30, a frequency divider 32, and a flip flop 34.

In operation, the 30 Hz reference signal is applied to the phase detector 28 which detects a phase difference between input 25 and input 27 and produces an output voltage which varies in magnitude proportionally with the difference in phase at these two signal inputs. The voltage output of the phase detector controls the voltage controlled oscillator to cause it to increase or decrease slightly in frequency from its 10.8 KHz center frequency, to phase adjust the feedback signal on line 27. When the feedback signal on line 27 matches the phase of the input 30 Hz reference signal on line 25, the voltage output of the phase detector 28 is minimized. The voltage controlled oscillator is selected to have a free running frequency of 10.8 KHz to produce one degree clock signals at its output 36. Since the antenna at the VOR station covers 360° 30 times a second, to divide the 30 Hz reference signal into 1° clock pulses a 10.8 KHz signal is required, since 30 Hz times 360 equals 10.8 KHz. The one degree clock pulses are then divided down by frequency divider 32 by 360 units to reproduce a low noise synthetically generated squarewave signal from the output of flip flop 34. The frequency divider produces output pulses at the 180° mark and 360° mark to set and reset the flip flop 34. The reference signal which is fed back to phase detector 28 on line 27 is an extremely low noise squarewave having a phase which is adjusted to match the input reference 30 Hz signal.

The squarewave 30 variation signal from limiting amplifier 14 is applied to a conventional 30 Hz phase lock loop 16 which has the effect of filtering the squarewave 30 Hz variation signal with high resolution. The filtered variation signal is then applied to an exclusive 37 OR" gate 18 which has the sole function of inverting the 30 Hz squarewave variation signal only when a control signal is applied, such as shown in FIG. 1 from switch 20. When the switch 20 is switched to the "from" condition, a logic "0" is applied to the control input of the exclusive "OR" gate 18 so that the variation signal is not inverted.

From the inverting exclusive "OR" gate 18, the variation signal is applied to a frequency divider 40, similar to frequency divider 38, which divides the variation signal frequency by two. The 15 Hz reference signal and 15 Hz variation signals are then applied to an exclusive "OR" gate 42 which produces a composite signal, schematically shown in FIGS. 6e through 11e. The composite signal has a duration during any interval which is proportional to VOR bearing. The composite signal is gated at 44 by the one degree clock pulses from the phase locked loop 26. The prescaler counter 46 is incremented by the gated pulses from 44 and produces an output pulse whenever its prescaler count is reached. This output pulse is fed to the binary coded decimal (BCD) counters 50 through 54. At the same time, interval counter 56, connected to the 15 Hz reference signal, keeps a tally of the number of intervals which are being counted by the prescaler counter 46. When a preselected number of intervals has occurred, interval counter 56 triggers single shot 60 which loads the accumulated count from BCD counters 50 through 54 into the bearing display 64. At the same time, single shot 62 produces a reset pulse which is applied to the prescaler counter 46, BCD counters 50 through 54, interval counter 56, and frequency divider 40.

In operation, if the prescaler counter were set to count 32 binary pulses to produce a single output pulse, the interval counter 56 would be adjusted to count 32 intervals before producing a load and reset pulse. This combination of elements therefore acts to average bearing reading over a plurality (in this case 32) of intervals, thereby greatly reducing the effect of noise on the overall output. Adjustments 48 and 58 can be used to adjust the interval period over which the bearing display will be updated. This can be done either electronically or mechanically and coupled to one another to eliminate any error in output. Resetting of flip flop 40 by single shot 62 at the time that the interval counter is reset, insures that the 15 Hz variation signal will be in proper state to begin the next cycle of counting. A complete count cycle or update period for averaging 32 intervals will require 32 times (67 milliseconds is the approximate period of the 15 Hz reference signal) which equals 2.13 seconds. A faster update may be desirable in the case where a more stable signal is present. The update frequency could also be made automatically as a function of receive signal quality.

Turning to the remaining figures, the operation of the exclusive "OR" 42 and the manner in which it negates the effective noise signals across the zero radial in the averaging process is diagramatically illustrated. FIGS. 6a through 6e show the wave pulses produced by the device at 358°. The composite signal as shown in FIG. 6e is the output of the exclusive "OR" 42. The exclusive "OR" 42 produces its output whenever the 15 Hz reference signal and 15 Hz variation signal, as shown in FIGS. 6c and 6d, respectively, are in opposing logic states. FIGS. 7a through 7e illustrate the waveform patterns produced at 2°. Again, whenever the 15 Hz reference signal and 15 Hz variation signal, as shown in FIGS. 7c and 7d, respectively, are in opposing logic states, the exclusive "OR" 42 produces a composite signal, as shown in FIG. 7e. FIGS. 8a through 8e and 9a through 9e show the signals produced by the device of the preferred embodiment at 178° and 182°, respectively,.

Considering the composite signals, a slight displacement due to noise across the zero radial does not substantially effect the length of the composite signal interval in comparison to the intervals which are not affected by noise, as one would expect at first glance. For example, if the aircraft were located at 2° and at least one pulse of the variation signal were affected by noise, such as shown in FIG. 10b, it would appear that the corresponding interval of the composite signal would have a magnitude similar to an interval such as that shown in FIG. 6e. This in fact would be the case if the exclusive "OR" gates were applied to the 30 Hz reference and variation signals. However, by dividing the 30 Hz reference and variation signals by two, the results as shown in FIGS. 10a through 10e and 11a through 11e, are obtained. As shown in FIG. 10e, when the 15 Hz reference and variation signals, as shown in FIGS. 10c and 10d, respectively, are applied to the exclusive "OR" gate 42, they produce the composite signal as shown in FIG. 10e. As shown in FIG. 10b, the fifth positive going pulse has been affected by noise across the zero radial to make it appear as a signal coming from, for example, the 358° radial. The noise signal has a minor effect on the composite signal, as shown in FIG. 10e, since the pulse has merely been displaced rather than creating an interval of a composite signal, such as shown in FIG. 6e. The same situation is also shown in FIGS. 11a through 11e for a 358° phase differential which has been displaced across the zero radial to make it appear as, for example, a 2° interval. Again, the intervals as shown in FIG. 11e have merely been displaced, having a very minor effect upon the overall average.

The circuitry of the present invention therefore provides an effective device for eliminating erroneous readouts due to noise or fading signals. The device has the advantages of increased reliability due to the elimination of moving parts, a much greatly increased bearing accuracy since the digital readout gives a resolution of up to one degree, and much greater stability in the readout in the presence of noisy or fading signals. In addition, the use of the exclusive "OR" 42 prevents false count averaging and erroneous bearing display when the received radial is varying a few degrees around the zero degree radial. This is all provided in a simply operated device which functions fully automatically to continuously provide the pilot or navigator with an updated digital display of his radial bearing from the VOR station.

Obviously many modifications and variations of the present invention are possible in light of the above teachings. It is therefore to be understood that within the scope of the appended claims the invention may be practiced otherwise than as specifically described.

What is claimed is:

1. A device for numerically displaying an indication of VOR bearing comprising:
   a. means for detecting reference and variation signals from a VOR bearing signal;
   b. phase lock loop means for rejecting noise from said reference and variation signals;
   c. means for frequency dividing said reference and variation signals by a factor of two;
   d. an exclusive "OR" gate responsive to said means for frequency dividing for producing a composite signal whenever said reference and variation signals exist in opposing logic states;
   e. means for detecting duration of said composite signal;
   f. means for numerically displaying a signal indicative of said VOR bearing in response to said duration of said composite signal.

2. The device of claim 1 wherein said phase lock loop means comprises:
   a. a first phase lock loop coupled to receive said variation signal;
   b. a second phase lock loop coupled to receive said reference signal, said second phase lock loop comprising voltage controlled oscillator means for producing one degree clock output pulses, a frequency divider, a flip-flop, and a phase detector.

3. The device of claim 1 wherein said means for detecting duration of said composite signal comprises logic gating means for producing a series of output pulses representative of VOR bearing in degrees:
   means for counting said output pulses representative of VOR bearing.

4. The device of claim 1 wherein said means for detecting duration of said composite signal comprises means for determining an average duration of a plurality of intervals of said composite signal.

5. The device of claim 4 wherein said means for determining an average duration of a plurality of intervals of said composite signal comprises:
   a. interval counter means for producing a load signal upon accumulating a predetermined number of intervals;
   b. prescaler counter means for producing an output signal upon accumulating a predetermined number of duration pulses from said composite signal.

6. A device for numerically indicating bearing from a VOR bearing signal comprising:
   a. means for detecting a reference signal from said VOR bearing signal;
   b. means for detecting a variation signal from said VOR bearing signal;
   c. means for producing a first low noise oscillator signal in response to said reference signal having the same phase as said reference signal;
   d. means for producing a second low noise oscillator signal in response to said variation signal having the same phase as said reference signal;
   e. an exclusive "OR" gate for comparing said first and second low noise oscillator signals to produce a composite signal whenever said first and second low noise oscillator signals exist in opposing logic states;
   means for detecting average duration of a plurality of composite signal intervals to numerically indicate bearing.

7. The device of claim 6 wherein said means for producing a first low noise oscillator signal comprises:
   a. voltage controlled oscillation means for producing a series of clock pulses representative of a predetermined amount of angular displacement;
   b. frequency divider means for reproducing said reference signal from said series of clock pulses; and
   c. phase detector means for adjusting said series of clock pulses in phase such that said reference signal reproduced by said frequency divider means has a phase which matches said reference signal.

8. The device of claim 6 wherein said means for detecting average duration of a plurality of composite signal intervals comprises:
   a. logic means for gating said composite signal by a series of clock pulses representative of a predetermined amount of angular displacement;
   b. means for counting signals from said logic means and producing a prescaler output signal upon accumulating a predetermined number of said gated signals;
   c. interval counter means for resetting said means for counting gated signals from said logic means to obtain a count in said interval counter means indicative of average duration of a plurality of composite signal intervals.

9. The device of claim 8 further comprising:
   a. binary coded decimal counters for accumulating said prescaler output signals;
   b. numeric display means activated in response to a load signal produced by said interval counter for reading out a digital number from said binary coded decimal counters indicative of said bearing.

10. A device for numerically indicating bearing from a VOR bearing signal comprising:
    a. means for detecting reference and variation signals from said VOR bearing signal;
    b. means for frequency dividing said reference and variation signals;
    c. an exclusive "OR" gate for comparing said reference and variation signals to produce a composite signal whenever said reference and variation signals exist in opposing logic states; and
    d. means for detecting duration of said composite signal to numerically indicate bearing.

11. The device of claim 10 wherein said means for detecting duration of said composite signal comprises means for detecting average duration of a plurality of composite signal intervals.

12. The device of claim 11 wherein said means for detecting average duration of a plurality of composite signal intervals comprises:
    a. logic means for gating said composite signal by a series of clock pulses representative of a predetermined amount of angular displacement;
    b. means for counting gated signals from said logic means and producing a prescaler output signal upon accumulating a predetermined number of said gated signals;
    c. interval counter means for resetting said means for counting gated signals from said logic means to obtain a count in said interval counter means indicative of average duration of a plurality of composite signal intervals.

* * * * *